US011366984B1

(12) United States Patent
Ni et al.

(10) Patent No.: US 11,366,984 B1
(45) Date of Patent: Jun. 21, 2022

(54) VERIFYING A TARGET OBJECT BASED ON CONFIDENCE COEFFICIENTS GENERATED BY TRAINED MODELS

(71) Applicant: EMC IP Holding Company LLC, Hopkinton, MA (US)

(72) Inventors: Jiacheng Ni, Shanghai (CN); Jinpeng Liu, Shanghai (CN); Qiang Chen, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/137,625

(22) Filed: Dec. 30, 2020

(30) Foreign Application Priority Data

Nov. 30, 2020 (CN) .......................... 202011382882.4

(51) Int. Cl.
*G06K 9/62* (2022.01)
*G06V 30/24* (2022.01)
*G06V 40/70* (2022.01)

(52) U.S. Cl.
CPC ......... *G06K 9/6257* (2013.01); *G06K 9/6259* (2013.01); *G06V 30/248* (2022.01); *G06V 40/70* (2022.01)

(58) Field of Classification Search
CPC ......... G06K 9/62–6298; G06K 9/6257; G06K 9/6259; G06V 40/70
See application file for complete search history.

(56) References Cited

U.S. PATENT DOCUMENTS

| 2018/0285767 | A1* | 10/2018 | Chew ...................... H04L 67/12 |
| 2018/0349370 | A9* | 12/2018 | Li ......................... G06K 9/6201 |
| 2020/0027009 | A1* | 1/2020 | Khan ...................... G06N 3/126 |
| 2020/0265132 | A1* | 8/2020 | Chang ................ G06K 9/00892 |
| 2020/0293783 | A1* | 9/2020 | Ramaswamy ...... G06K 9/00221 |
| 2020/0342272 | A1 | 10/2020 | Lin et al. |

OTHER PUBLICATIONS

S. Shalev-Shwartz, "Online Learning and Online Convex Optimization," Foundations and Trends in Machine Learning, vol. 4, No. 2, 2011, pp. 107-194.

(Continued)

*Primary Examiner* — Casey L Kretzer
(74) *Attorney, Agent, or Firm* — Ryan, Mason & Lewis, LLP (57) ABSTRACT

Embodiments include a method, an electronic device, and a computer program product for information processing. In an example embodiment, a method for information processing includes: acquiring, at a first device, a first feature associated with a target object; applying the first feature to a trained first model deployed at the first device to determine a first confidence coefficient, the first confidence coefficient being associated with probabilities that the first model determines the target object as a real object and as a false object; if the first confidence coefficient is lower than a first threshold confidence coefficient, sending a request for verifying the target object to a second device, the second device being deployed with a trained second model for verifying the target object, and the second model being more complex than the first model; and updating the first model based on a response to the request.

20 Claims, 6 Drawing Sheets

(56) References Cited

OTHER PUBLICATIONS

S. Han et al., "Deep Compression: Compressing Deep Neural Networks with Pruning, Trained Quantization and Huffman Coding," arXiv:1510.00149v5, Feb. 15, 2016, 14 pages.
K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.
Z. Liu et al., "Learning Efficient Convolutional Networks through Network Slimming," arXiv:1708.06519v1 [cs.CV], Aug. 22, 2017, 10 pages.
S. Ahmad et al., "Unsupervised Real-Time Anomaly Detection for Streaming Data," Neurocomputing, Apr. 22, 2017, pp. 134-147.
spark.apache.org, "Clustering—RDD-Based API," http://spark.apache.org/docs/latest/mllib-clustering.html, downloaded Jun. 27, 2019, 20 pages.
U.S. Appl. No. 16/805,065 filed in the name of Ruixue Zhang et al. on Feb. 28, 2020, and entitled "Methods, Devices, and Computer Program Products for Model Adaptation."
U.S. Appl. No. 16/824,834 filed in the name of Wenbin Yang et al. on Mar. 20, 2020, and entitled "Method, Device, and Program Product for Determining Model Compression Rate."
U.S. Appl. No. 17/067,908 filed in the name of Qiang Chen et al. on Oct. 12, 2020, and entitled "Method for Managing Artificial Intelligence Application, Device, and Program Product."

\* cited by examiner

| Feature | Model type | Model identifier | Layer | Training device | Deployment device |
|---|---|---|---|---|---|
| Keystroke mode | LSTM | First model | 1 | First device | First device |
| Gesture | MobileNet | Second model | 2 | Second device | First device |
| Face | Inception-Resnet | Third model | 3 | Second device | Second device |

VERIFYING A TARGET OBJECT BASED ON CONFIDENCE COEFFICIENTS GENERATED BY TRAINED MODELS

RELATED APPLICATION(S)

The present application claims priority to Chinese Patent Application No. 202011382882.4, filed Nov. 30, 2020, and entitled "Method, Electronic Device, and Computer Program Product for Information Processing," which is incorporated by reference herein in its entirety.

FIELD

Embodiments of the present disclosure generally relate to information processing, and in particular, to a method, an electronic device, and a computer program product for processing information.

BACKGROUND

At present, with the evolution of Internet of Things (IoT) technology, a large number of edge devices of various types are connected to the IoT. However, in IoT applications, perception capabilities of different edge devices are quite different, and there is also a big difference between the performance of edge devices and core devices such as cloud servers. Therefore, it is difficult to implement a stacked machine learning strategy across different devices.

SUMMARY

The embodiments of the present disclosure provide a method, an electronic device, and a computer program product for information processing.

In a first aspect of the present disclosure, a method for information processing is provided. The method includes: acquiring, at a first device, a first feature associated with a target object; applying the first feature to a trained first model deployed at the first device to determine a first confidence coefficient, the first confidence coefficient being associated with probabilities that the first model determines the target object as a real object and as a false object; if the first confidence coefficient is lower than a first threshold confidence coefficient, sending a request for verifying the target object to a second device, the second device being deployed with a trained second model for verifying the target object, and the second model being more complex than the first model; and updating the first model based on a response to the request, the response being from the second device.

In a second aspect of the present disclosure, a method for information processing is provided. The method includes: receiving, at a second device from a first device, a request for verifying a target object; acquiring a second feature associated with the target object based on the request; applying the second feature to a trained second model deployed at the second device to determine a second confidence coefficient, the second confidence coefficient being associated with probabilities that the second model determines the target object as a real object and as a false object; and sending a response to the request to the first device based on the second confidence coefficient, so as to update a first model deployed at the first device and for verifying the target object, the second model being more complex than the first model.

In a third aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: acquiring, at a first device, a first feature associated with a target object; applying the first feature to a trained first model deployed at the first device to determine a first confidence coefficient, the first confidence coefficient being associated with probabilities that the first model determines the target object as a real object and as a false object; if the first confidence coefficient is lower than a first threshold confidence coefficient, sending a request for verifying the target object to a second device, the second device being deployed with a trained second model for verifying the target object, and the second model being more complex than the first model; and updating the first model based on a response to the request, the response being from the second device.

In a fourth aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: receiving, at a second device from a first device, a request for verifying a target object; acquiring a second feature associated with the target object based on the request; applying the second feature to a trained second model deployed at the second device to determine a second confidence coefficient, the second confidence coefficient being associated with probabilities that the second model determines the target object as a real object and as a false object; and sending a response to the request to the first device based on the second confidence coefficient, so as to update a first model deployed at the first device and for verifying the target object, the second model being more complex than the first model.

In a fifth aspect of the present disclosure, a computer program product is provided. The computer program product is tangibly stored on a non-transitory computer-readable medium and includes machine-executable instructions. The machine-executable instructions, when executed, cause a machine to implement any step of the method described according to the first aspect of the present disclosure.

In a sixth aspect of the present disclosure, a computer program product is provided. The computer program product is tangibly stored on a non-transitory computer-readable medium and includes machine-executable instructions. The machine-executable instructions, when executed, cause a machine to implement any step of the method described according to the second aspect of the present disclosure.

This Summary is provided to introduce the selection of concepts in a simplified form, which will be further described in the Detailed Description below. The Summary is not intended to identify key features or essential features of the present disclosure, nor is it intended to limit the scope of the present disclosure.

DESCRIPTION OF THE DRAWINGS

The above and other objectives, features, and advantages of the present disclosure will become more apparent by the following description of example embodiments of the pres

In the accompanying drawings, the same or corresponding numerals represent the same or corresponding parts.

DETAILED DESCRIPTION

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided so that this disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like, may refer to different or the same objects. Other explicit and implicit definitions may also be included below.

As described above, in IoT applications, perception capabilities of different edge devices are quite different, and there is also a big difference between the performance of edge devices and core devices such as cloud servers. For example, face recognition requires a high-precision camera to capture a user's face, and a core device with a graphics processing unit (GPU) or a tensor processing unit (TPU) may perform face recognition with an acceptable response time (high perception, high latency, and high computing capability). However, fingerprint recognition requires a fingerprint sensor to acquire a user's fingerprint, and a fingerprint matching algorithm may be efficiently executed by edge devices (low perception, low latency, and low computing capability). For a machine learning problem in a multi-layer IoT architecture, it is necessary to use the perception capabilities, access latencies, and computing capabilities of both edge devices and core devices to build accurate, self-adaptive, and efficient machine learning systems for model training, deployment, and inference.

According to an example embodiment of the present disclosure, an improved solution for information processing is provided. In this solution, a first device, such as an edge device, may acquire a first feature associated with a target object, for example, a fingerprint of a user to be verified. The first device may apply the first feature to a trained first model deployed at the first device to determine a first confidence coefficient. The first confidence coefficient is associated with the probabilities that the first model determines the target object as a real object and as a false object, for example, the probabilities that the user to be verified is determined as a real user and as a false user. If the first confidence coefficient is lower than a first threshold confidence coefficient, the first device may send a request for verifying the target object to a second device such as a core device. The second device is deployed with a trained second model for verifying the target object, and the second model is more complex than the first model.

The second device may receive from the first device a request for verifying the target object, and acquire a second feature associated with the target object based on the request, for example, the face of the same user to be verified. The second device may apply the second feature to a trained second model deployed at the second device to determine a second confidence coefficient. The second confidence coefficient is associated with the probabilities that the second model determines the target object as a real object and as a false object. The second device may send a response to the request to the first device based on the second confidence coefficient. The response may include a verification result for the target object in order that the first device retrains the first model, or may directly include a first model that has been retrained by the second device. Therefore, the first device may update the first model based on the response.

In this way, a stacked machine learning strategy can be implemented across different devices.

The solution in illustrative embodiments provides a machine learning system configured to train, deploy, and infer a series of models for a machine learning problem in a multi-layer IoT architecture, to coordinate the use of perception capabilities, access latencies, and computing capabilities of edge devices and core devices. Therefore, this solution may achieve a balance between model accuracy, model adaptability, and model efficiency. The embodiments of the present disclosure will be specifically described below with reference to the accompanying drawings.

Figure 1:
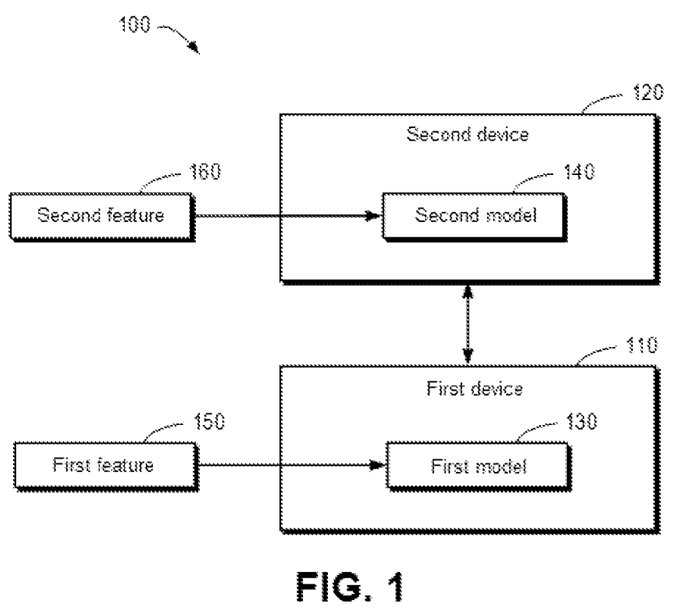
- FIG. 1 shows a schematic diagram of an example of an information processing environment where some embodiments of the present disclosure can be implemented.

FIG. 1 shows a schematic diagram of an example of information processing environment 100 where some embodiments of the present disclosure can be implemented. Information processing environment 100 includes first device 110 and second device 120. For example, first device 110 may be an edge device. The edge device may be any computing device with data collecting and computing capabilities. As an example, first device 110 may be a personal computer, a tablet computer, a wearable device, a camera, a robot, medical equipment, a vehicle, etc. Second device 120 may be a core device. The core device may be any computing device with better computing capabilities. As an example, second device 120 may be a cloud server, a mainframe, a distributed computing system, etc.

First device 110 and second device 120 may cooperate to implement a machine learning system to train, deploy, and infer a series of models for a machine learning problem in a multi-layer IoT architecture. Specifically, for the machine learning problem, a group of related goals may be designed. For example, the related goals may be that a fingerprint of a user matches the fingerprint of a real user and the face of the user matches the face of the real user. These goals may be inferred through different models. These models may be divided into different layers according to complexities of the models or complexities of features input to the models. Therefore, these models are trained, deployed, and inferred at different layers on edge devices and core devices with different perception capabilities, access latencies, and computing capabilities to make better use of resources of an IoT infrastructure.

For example, highly complex models (high-layer models to which the inputs are highly complex features, such as an Inception-Resnet model) may be trained, deployed, and inferred on core devices. Moderately complex models (middle-layer models to which the inputs are moderately complex features, such as a MobileNet model) may be trained on core devices and compressed for deployment and inference on edge devices. Simple models (low-layer models to which the inputs are simple features, such as a logistic regression model and a support vector machine model) may be trained, deployed, and inferred on edge devices.

The models at these different layers are not isolated, and the calling of a high-layer model depends on whether an inference result of a low-layer model (alternatively referred to as a "verification result" in the case where the model is used for verification) may meet a confidence coefficient condition. If the confidence coefficient condition is not met, model calling is conducted from a low layer to a high layer (for example, from layer 1 to layer n). In some embodiments, the called model will be placed in a model stack. Then, a next-layer (for example, layer n+1) model continues to be called.

Figure 2:
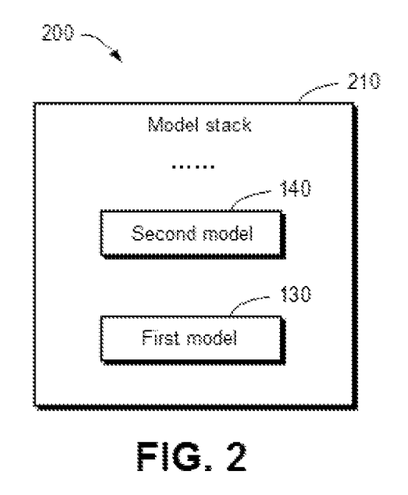
FIG. 2 shows a schematic diagram of an example of a model stack according to some embodiments of the present disclosure.

FIG. 2 shows schematic diagram 200 of an example of a model stack according to some embodiments of the present disclosure. As shown in FIG. 2, according to a calling sequence, model stack 210 sequentially includes first model 130 called first, second model 140 called later, and possibly other higher-layer models called later.

A final result is determined by voting for an inference result of each model (for example, the inference result output by each model most frequently is used as the final result), or by an inference result of the called highest-layer model. If a lower-layer model meets a confidence coefficient condition so that the inference result may be obtained with confidence, there is no need to call a higher-layer model, which can save the computing cost. In some embodiments, if a confidence coefficient condition cannot be met even though the highest-layer model is called, the user may be requested to manually input for verification, for example, verifying by a short messaging service (SMS).

The inference result of the called highest-layer model may be used as a ground truth of a low-layer model, so that the low-layer model may be automatically evolved under the guidance of the high-layer model. For example, if an inference result of a model meets a confidence coefficient condition, the model may be popped from the model stack, and a low-layer model may be trained online or retrained through a ground truth obtained from the popped model to support automatic improvement of the low-layer model. The improvement of the low-layer model may avoid the high computing cost caused by calling the high-layer model, thereby further reducing the total computing cost.

In some embodiments, in the retraining of models, for a complex model, data newly collected or collected online, instead of a complete training data set, may be used for retraining. For example, small batches of newly collected data may be used for retraining. For a simple model, an entire training data set (an original training data set and newly collected data) may be used to retrain the model.

Based on the foregoing principles, first model 130 may be deployed at first device 110, and second model 140 may be deployed at second device 120. Second model 140 is more complex than first model 130, and second feature 160 input to second model 140 is also more complex than first feature 150 input to first model 130. As an example, first model 130 may be a logistic regression model, a support vector machine model, a MobileNet model, etc., and second model 140 may be an Inception-Resnet model, etc. In addition, first feature 150 may be a keystroke mode, a gesture, a fingerprint, etc., and second feature 160 may be a face, etc.

Therefore, first device 110 may acquire first feature 150 associated with a target object, for example, a fingerprint of a user, and apply first feature 150 to first model 130 to determine a first confidence coefficient. The first confidence coefficient is associated with the probabilities that first model 130 determines the target object as a real object and as a false object, for example, the probabilities that the user to be verified is determined as a real user and as a false user. In some embodiments, the first confidence coefficient may be an entropy of the probabilities that first model 130 determines the target object as a real object and as a false object. For example, a softmax layer of first model 130 may output the probabilities that the target object is a real object and is a false object, and the first confidence coefficient may be an entropy of an output of the softmax layer.

If the first confidence coefficient is lower than a first threshold confidence coefficient, first device 110 may send a request for verifying the target object to second device 120. After receiving the request, second device 120 may acquire second feature 160 associated with the target object based on the request, for example, the user's face. In some embodiments, second feature 160 may be collected by first device 110 and provided to second device 120. Alternatively, second device 120 may also collect second feature 160 or acquire second feature 160 from another device.

Second device 120 may apply second feature 160 to second model 140 to determine a second confidence coefficient. Similar to the first confidence coefficient, the second confidence coefficient is associated with the probabilities that second model 140 determines the target object as a real object and as a false object. In some embodiments, the second confidence coefficient may be an entropy of the probabilities that second model 140 determines the target object as a real object and as a false object, for example, an entropy of an output of a softmax layer of second model 140. Second device 120 may send a response to the request to first device 110 based on the second confidence coefficient. Therefore, the first device may update first model 130 based on the response. The model update will be described in detail below in conjunction with FIGS. 3-4.

It should be understood that although first model 130 and second model 140 are described as being deployed on different devices, first model 130 and second model 140 may also be deployed on the same device.

In this way, when a simple low-layer model does not meet a confidence coefficient condition, a more complex high-layer model may be called, especially, a high-layer model deployed on a core device with higher performance may be called across devices. Therefore, a more accurate inference result may be obtained. In addition, the inference result of the high-layer model may be used as a ground truth of the low-layer model to automatically evolve the low-layer model under the guidance of the high-layer model. The improvement of the low-layer model may avoid the high computing cost caused by calling the high-layer model, thereby further reducing the total computing cost. Further, the automatic evolution of a model may also improve the adaptability and decision-making efficiency of the model.

Figure 3:
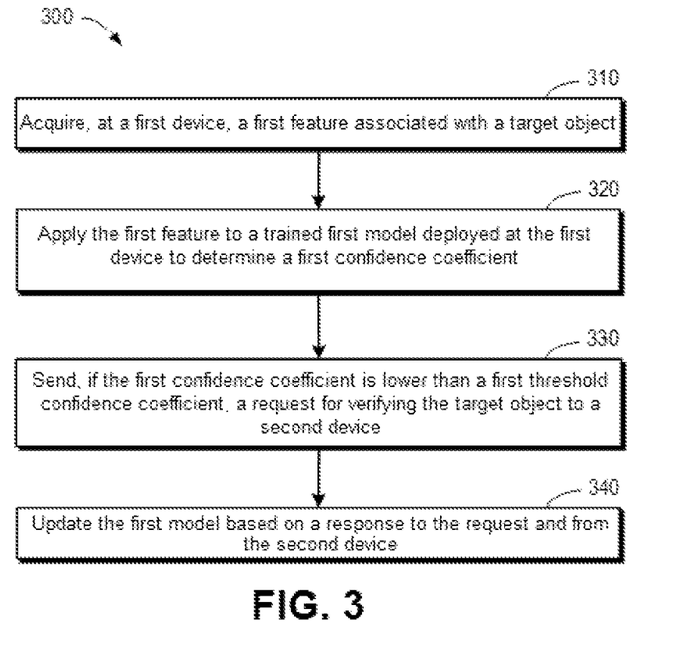
FIG. 3 shows a flowchart of an example of a method for information processing at a first device according to some embodiments of the present disclosure.

FIG. 3 shows a flowchart of method 300 for information processing at a first device according to some embodiments of the present disclosure. Method 300 may be implemented by first device 110 shown in FIG. 1. Alternatively, method 300 may also be implemented by other entities besides first device 110. It should be understood that method 300 may also include additional steps not shown and/or may omit the steps shown, and that the scope of the present disclosure is not limited in this respect.

At 310, first device 110 acquires first feature 150 associated with a target object. For example, first device 110 may acquire a keystroke mode, a gesture, a fingerprint, a voice, and/or the face of a user to be verified.

At 320, first device 110 applies first feature 150 to trained first model 130 deployed at first device 110 to determine a first confidence coefficient. The first confidence coefficient is associated with the probabilities that first model 130 determines the target object as a real object and as a false object.

If the first confidence coefficient is lower than a first threshold confidence coefficient, then at 330, first device 110 sends a request for verifying the target object to second device 120. Second device 120 is deployed with trained second model 140 for verifying the target object, and second model 140 is more complex than first model 130. The first confidence coefficient being low means that the verification result of first model 130 may be incorrect. In this case, more complex second model 140 may be called to make a more accurate judgment.

At 340, first device 110 updates first model 130 based on a response to the request, the response being received from second device 120. As described above, in the case where a higher-layer model on second device 120 gives a more accurate verification result, the verification result may be used to retrain first model 130. In some embodiments, the retraining of first model 130 may be performed by second device 120. In this case, the response includes a first model retrained by second device 120, and first device 110 may replace first model 130 with the retrained first model.

In some embodiments, the retraining of first model 130 may be performed by first device 110. In this case, the response includes a verification result for the target object, and first device 110 may retrain first model 130 based at least on first feature 150 and the verification result. Alternatively, in addition to first feature 150 and the verification result, first model 130 may use an original training data set to conduct retraining. Specifically, first device 110 may acquire a training feature associated with a training object for training first model 130. In addition, first device 110 may also acquire a training label indicating whether the training object is a real object. First device 110 may retrain first model 130 based on the training feature, the training label, first feature 150, and the verification result.

Figure 4:
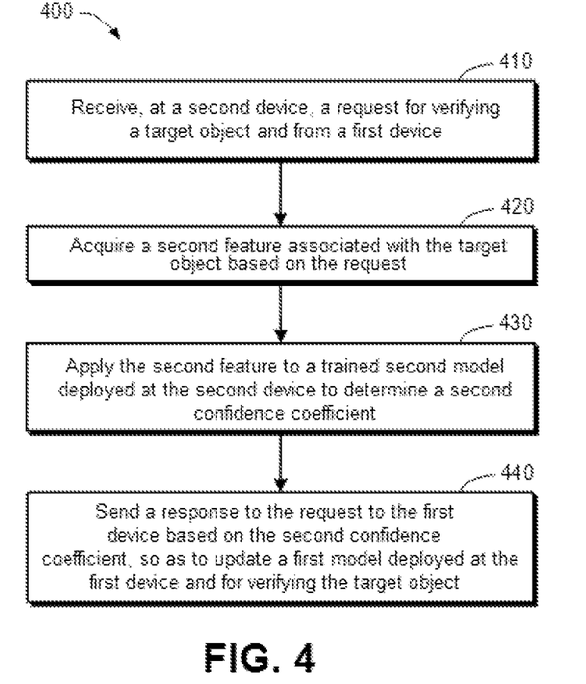
FIG. 4 shows a flowchart of an example of a method for information processing at a second device according to some embodiments of the present disclosure.

FIG. 4 shows a flowchart of method 400 for information processing at a second device according to some embodiments of the present disclosure. Method 400 may be implemented by second device 120 shown in FIG. 1. Alternatively, method 400 may also be implemented by other entities besides second device 120. It should be understood that method 400 may also include additional steps not shown and/or may omit the steps shown, and that the scope of the present disclosure is not limited in this respect.

At 410, second device 120 receives a request for verifying a target object, from first device 110. At 420, second device 120 acquires second feature 160 associated with the target object based on the request. For example, second feature 160 may be a keystroke mode, a gesture, a fingerprint, a voice, and/or the face of a user to be verified. In some embodiments, first feature 150 and second feature 160 may be different features, and second feature 160 may be more complex than first feature 150. For example, first feature 150 may be a keystroke mode of a user, and second feature 160 may be a gesture of the user.

At 430, second device 120 applies second feature 160 to trained second model 140 deployed at second device 120 to determine a second confidence coefficient. The second confidence coefficient is associated with the probabilities that second model 140 determines the target object as a real object and as a false object. At 440, second device 120 sends a response to the request to first device 110 based on the second confidence coefficient, so as to update first model 130 deployed at first device 110 and for verifying the target object. Second model 140 is more complex than first model 130.

As described above, in the case where a called high-layer model meets a confidence coefficient condition, a verification result of the high-layer model may be used as a ground truth of a low-layer model for retraining the low-layer model. Specifically, in some embodiments, first model 130 is retrained at first device 110. In this case, if the second confidence coefficient exceeds a second threshold confidence coefficient, second device 120 generates a verification result that the target object is a real object, includes the verification result in a response, and sends the response to first device 110.

Alternatively, in some embodiments, first model 130 is retrained at second device 120. In this case, if the second confidence coefficient exceeds a second threshold confidence coefficient, second device 120 may generate a verification result that the target object is a real object. Second device 120 may retrain first model 130 based at least on first feature 150 and the verification result. Therefore, second device 120 may send a response including the retrained first model to first device 110.

Alternatively, in addition to first feature 150 and the verification result, first model 130 may use an original training data set to conduct retraining. Specifically, second device 120 may acquire a training feature associated with a training object for training first model 130. In addition, second device 120 may also acquire a training label indicating whether the training object is a real object. Second device 120 may retrain first model 130 based on the training feature, the training label, first feature 150, and the verification result.

In some embodiments, considering that some large neural network models have many layers and nodes, reducing the storage and computing costs thereof is of great importance. Therefore, a model may be compressed. For example, model compression may be performed in two ways: pruning and quantization. Pruning involves removing layers with unimportant weights (for example, weights with small absolute values) to remove redundant connections in the model. Quantification involves clustering or rounding weights to use fewer storage resources to represent the same number of connections. For example, a weight may be expressed by using a floating-point number with a smaller number of digits, or a floating-point representation of the weight may be converted into a fixed-point representation. Therefore, second device 120 may adjust parameters of layers in the retrained first model to compress the retrained first model.

Then, second device 120 may include the compressed first model in the response, and send the response to first device 110.

In the case where a called high-layer model still does not meet a confidence coefficient condition, a more complex higher-layer model may be called. This process will be carried out iteratively until the called model meets the confidence coefficient condition, or until the highest-layer model cannot meet the confidence coefficient condition either, and manual verification by the user is required.

Specifically, in some embodiments, if the second confidence coefficient is still lower than the second threshold confidence coefficient, second device 120 may acquire a third feature associated with the target object. For example, the third feature may be a keystroke mode, a gesture, a fingerprint, a voice, and/or the face of a user to be verified. In some embodiments, first feature 150, second feature 160, and the third feature may be different features, and the third feature may be more complex than first feature 150 and second feature 160. For example, first feature 150 may be a keystroke mode of the user, second feature 160 may be a gesture of the user, and the third feature may be the face of the user.

Similar to using second model 140, second device 120 may apply the third feature to a trained third model deployed at second device 120 to determine a third confidence coefficient. The third model is more complex than second model 140. The third confidence coefficient is associated with the probabilities that the third model classifies the target object into a real object and into a false object. For example, similar to the first confidence coefficient and the second confidence coefficient, the third confidence coefficient may be an entropy of the probabilities that second model 140 determines the target object as a real object and as a false object, for example, an entropy of an output of a softmax layer of the third model.

Therefore, second device 120 may send a response to first device 110 based on the third confidence coefficient. The operation of sending a response to first device 110 based on a third confidence coefficient is similar to the operation of sending a response to first device 110 based on a second confidence coefficient, and therefore, the description is omitted here.

In this way, when a simple low-layer model does not meet a confidence coefficient condition, a more complex high-layer model may be called, especially, a high-layer model deployed on a core device with higher performance may be called across devices. Therefore, a more accurate inference result may be obtained. In addition, the inference result of the high-layer model may be used as a ground truth of the low-layer model to automatically evolve the low-layer model under the guidance of the high-layer model. The improvement of the low-layer model may avoid the high computing cost caused by calling the high-layer model, thereby further reducing the total computing cost. Further, the automatic evolution of a model may also improve the adaptability and decision-making efficiency of the model.

Figure 5:
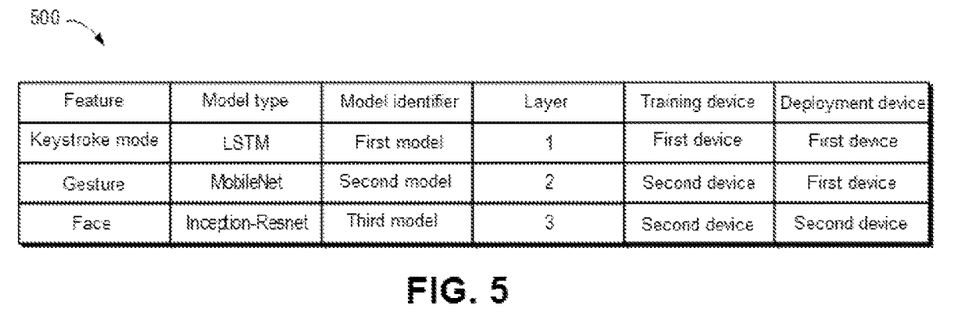
FIG. 5 shows a schematic diagram of an information processing example according to some embodiments of the present disclosure.

FIG. 5 shows schematic diagram 500 of an information processing example according to some embodiments of the present disclosure. In FIG. 5, a first model is an LSTM model for processing keystroke modes, which is in layer 1 of a model stack and is trained and deployed on a first device. A second model is a MobileNet model for processing gestures, which is in layer 2 of the model stack and is trained on a second device and deployed on the first device. A third model is an Inception-Resnet model for processing faces, which is in layer 3 of the model stack and is trained and deployed on the second device.

According to the layer numbers where models are located, the first model, the second model, and the third model enter the model stack in sequence. If face verification of the third model at the highest layer satisfies a confidence coefficient condition, a verification result of the third model will be used as a ground truth to retrain the second model and the first model at the lower layers, thereby implementing the automatic evolution of a model. In this case, the models are popped from the model stack in sequence (the popping sequence is: the third model, the second model, and the first model) to be retrained based on the ground truth.

Figure 6:
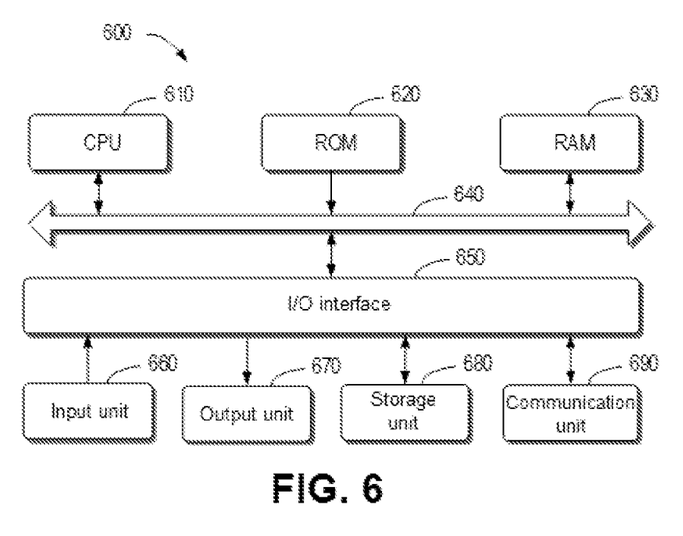
FIG. 6 shows a schematic block diagram of an example device that may be used to implement an embodiment of the present disclosure.

FIG. 6 shows a schematic block diagram of example device 600 that may be used to implement an embodiment of the present disclosure. For example, first device 110 and second device 120 shown in FIG. 1 may be implemented by device 600. As shown in the figure, device 600 includes a processing unit, illustratively a central processing unit (CPU) 610, that may execute various appropriate actions and processing according to computer program instructions stored in read-only memory (ROM) 620 or computer program instructions loaded from storage unit 680 into random access memory (RAM) 630. In RAM 630, various programs and data required for operations of device 600 may also be stored. CPU 610, ROM 620, and RAM 630 are connected to each other through bus 640. Input/output (I/O) interface 650 is also connected to bus 640.

Multiple components in device 600 are connected to I/O interface 650, including: input unit 660, such as a keyboard and a mouse; output unit 670, such as various types of displays and speakers; storage unit 680, such as a magnetic disk and an optical disk; and communication unit 690, such as a network card, a modem, and a wireless communication transceiver. Communication unit 690 allows device 600 to exchange information/data with other devices over a computer network such as an Internet and/or various telecommunication networks.

The various processes and processing described above, for example, processes 300 and 400, may be performed by CPU 610. For example, in some embodiments, processes 300 and 400 may be implemented as a computer software program that is tangibly included in a machine-readable medium, for example, storage unit 680. In some embodiments, part or all of the computer program may be loaded and/or installed to device 600 via ROM 620 and/or communication unit 690. When the computer program is loaded into RAM 630 and executed by CPU 610, one or more actions of processes 300 and 400 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a RAM, a ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device (for example, a punch card or a raised structure in a groove with instructions stored thereon), and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams and a combination of blocks in the flowcharts and/or block diagrams may be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated various embodiments. The selection of terms used herein is intended to best explain the principles and practical applications of the embodiments or technical improvements to technologies in the market, and to otherwise enable persons of ordinary skill in the art to understand the embodiments disclosed herein.

What is claimed is:

1. A method for information processing, comprising:
   acquiring, at a first device, a first feature associated with a target object;
   applying the first feature to a trained first model deployed at the first device to determine a first confidence coefficient, the first confidence coefficient being associated with probabilities that the first model determines the target object as a real object and as a false object;

if the first confidence coefficient is lower than a first threshold confidence coefficient, sending a request for verifying the target object to a second device, the second device being deployed with a trained second model for verifying the target object based on a second feature different from any feature applied to the trained first model, the second model being more complex than the first model; and updating the first model based on a response to the request, the response being from the second device.

2. The method according to claim 1, wherein the first feature comprises at least one of the following: keystroke mode, gesture, fingerprint, voice, and face.

3. The method according to claim 1, wherein the response comprises a verification result for the target object, and updating the first model comprises:

retraining the first model based at least on the first feature and the verification result.

4. The method according to claim 3, wherein retraining the first model comprises:

acquiring a training feature, the training feature being associated with a training object for training the first model;

acquiring a training label, the training label indicating whether the training object is a real object; and retraining the first model based on the training feature, the training label, the first feature, and the verification result.

5. The method according to claim 1, wherein the response comprises the first model retrained by the second device, and updating the first model comprises:

replacing the first model with the retrained first model.

6. A non-transitory computer-readable medium with a computer program product tangibly stored thereon and comprising machine-executable instructions, wherein the machine-executable instructions, when executed by a machine, cause the machine to perform the steps of the method according to claim 1.

7. A method for information processing, comprising:

responsive to a first confidence coefficient being lower than a first threshold confidence coefficient, the first confidence coefficient being associated with probabilities that a trained first model deployed at a first device determines a target object as a real object and as a false object based on a first feature associated with the target object, receiving, at a second device from the first device, a request for verifying the target object;

acquiring a second feature associated with the target object based on the request, the second feature being different from any feature applied to the trained first model;

applying the second feature to a trained second model deployed at the second device to determine a second confidence coefficient, the second confidence coefficient being associated with probabilities that the second model determines the target object as the real object and as the false object; and sending a response to the request to the first device based on the second confidence coefficient, so as to update the first model deployed at the first device and for verifying the target object, the second model being more complex than the first model.

8. The method according to claim 7, wherein the second feature comprises at least one of the following: keystroke mode, gesture, fingerprint, voice, and face.

9. The method according to claim 7, wherein sending the response to the first device comprises:

if the second confidence coefficient is lower than a second threshold confidence coefficient, acquiring a third feature associated with the target object;

applying the third feature to a trained third model deployed at the second device to determine a third confidence coefficient, the third confidence coefficient being associated with probabilities that the third model classifies the target object into the real object and into the false object, and the third model being more complex than the second model; and sending the response to the first device based on the third confidence coefficient.

10. The method according to claim 7, wherein sending the response to the first device comprises:

if the second confidence coefficient exceeds a second threshold confidence coefficient, generating a verification result that the target object is the real object;

including the verification result in the response; and sending the response to the first device.

11. The method according to claim 7, wherein sending the response to the first device comprises:

if the second confidence coefficient exceeds a second threshold confidence coefficient, generating a verification result that the target object is the real object;

retraining the first model based at least on the first feature and the verification result; and sending the response to the first device, the response comprising the retrained first model.

12. The method according to claim 11, wherein retraining the first model comprises:

acquiring a training feature, the training feature being associated with a training object for training the first model;

acquiring a training label, the training label indicating whether the training object is a real object; and retraining the first model based on the training feature, the training label, the first feature, and the verification result.

13. The method according to claim 11, wherein sending the response comprises:

adjusting parameters of layers in the retrained first model to compress the retrained first model;

including the compressed first model in the response; and sending the response to the first device.

14. A non-transitory computer-readable medium with a computer program product tangibly stored thereon and comprising machine-executable instructions, wherein the machine-executable instructions, when executed by a machine, cause the machine to perform the steps of the method according to claim 7.

15. An apparatus, comprising:

at least one processing unit; and at least one memory that is coupled to the at least one processing unit and stores instructions for execution by the at least one processing unit, wherein the instructions, when executed by the at least one processing unit, cause the apparatus to perform actions comprising:

acquiring, at a first device, a first feature associated with a target object;

applying the first feature to a trained first model deployed at the first device to determine a first confidence coefficient, the first confidence coefficient being associated with probabilities that the first model determines the target object as a real object and as a false object;

if the first confidence coefficient is lower than a first threshold confidence coefficient, sending a request for verifying the target object to a second device, the second device being deployed with a trained second model for verifying the target object based on a second feature different from any feature applied to the trained first model, the second model being more complex than the first model; and updating the first model based on a response to the request, the response being from the second device.

16. The apparatus according to claim 15, wherein the first feature comprises at least one of the following: keystroke mode, gesture, fingerprint, voice, and face.

17. The apparatus according to claim 15, wherein the response comprises a verification result for the target object, and updating the first model comprises:

retraining the first model based at least on the first feature and the verification result.

18. The apparatus according to claim 17, wherein retraining the first model comprises:

acquiring a training feature, the training feature being associated with a training object for training the first model;

acquiring a training label, the training label indicating whether the training object is a real object; and retraining the first model based on the training feature, the training label, the first feature, and the verification result.

19. The apparatus according to claim 15, wherein the response comprises the first model retrained by the second device, and updating the first model comprises:

replacing the first model with the retrained first model.

20. The apparatus according to claim 15 wherein the at least one processing unit and the at least one memory implement the first device and the second device, wherein the instructions, when executed by the at least one processing unit, cause the second device to perform actions comprising:

receiving the request for verifying the target object, from the first device;

acquiring the second feature associated with the target object based on the request;

applying the second feature to the trained second model deployed at the second device to determine a second confidence coefficient, the second confidence coefficient being associated with probabilities that the second model determines the target object as the real object and as the false object; and sending the response to the request to the first device based on the second confidence coefficient, so as to update the first model deployed at the first device and for verifying the target object.

* * * * *